Patented Nov. 17, 1936

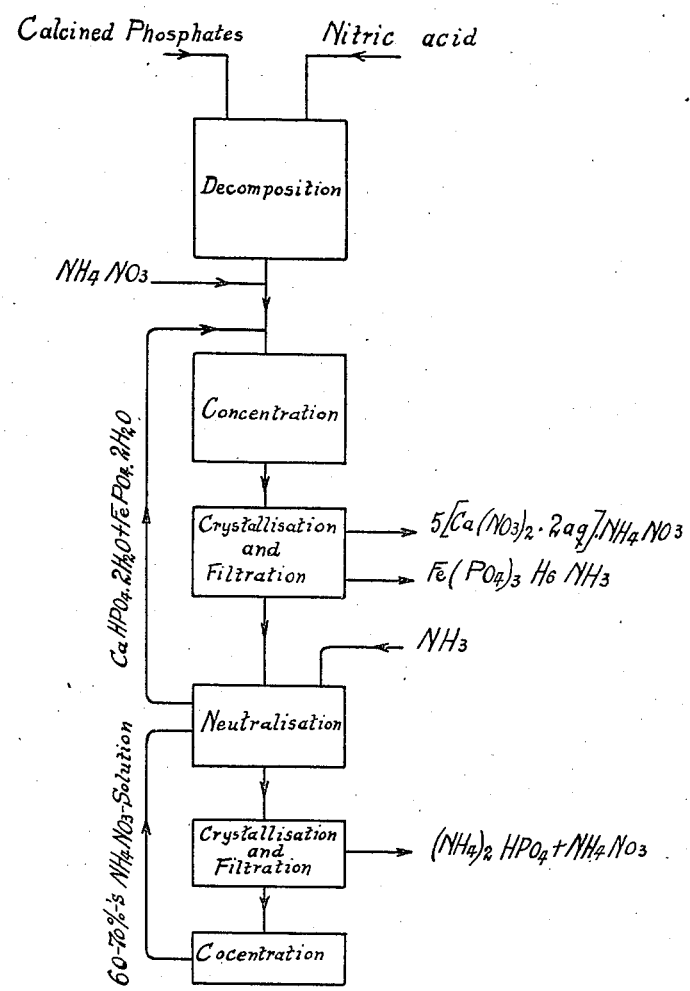

2,061,191

UNITED STATES PATENT OFFICE 2,061,191

TREATMENT OF RAW PHOSPHATES

Antonius Foss, Olaf Jensen, and Odd Herbert Lunde, Oslo, Norway, assignors to Norsk Hydro-Elektrisk Kvaelstofaktieselskab, Oslo, Norway Application May 27, 1932, Serial No. 613,836
In Norway November 21, 1931

7 Claims. (Cl. 23—102)

Our invention relates to the treatment of phosphatic rocks or "raw phosphates" for the purpose of obtaining valuable products for use in industry and agriculture. More especially our invention relates to the treatment of said raw materials with nitric acid in order to obtain phosphoric acid, simultaneously causing the calcium-nitrate formed to combine with the ammonium radical forming thereby valuable double compounds.

Heretofore raw-phosphates have been treated with nitric acid, in some cases after first having been calcined, causing the lime to be deposited in the form of nitrate of calcium, thereafter treating the solution for obtaining phosphoric acid, phosphoric salts or fertilizer products. When following this process the lime may as is well known be separated from the phosphoric acid and the water present, by employing for the dissolving process nitric acid of so high concentration, that the nitrate of calcium is not dissolved. Another way proposed has been to use a diluted nitric acid and thereupon cause the deposition of the calcium nitrate by adding concentrated nitric acid. In the latter case instead of adding concentrated nitric acid the solution under treatment may be cooled down so far that nitrate of calcium deposits in crystalline form.

When operating in one or another way as above explained great costs are incurred, concentrated nitric acid being expensive and the process has the drawback that the apparatus employed very soon is destroyed. Moreover the cooling process is also an expensive procedure.

The main object of our present invention is to make it possible to carry out the process of dissolving the raw phosphates by means of nitric acid in a more economic manner than has heretofore been possible and by means of a simple apparatus.

An important feature of our invention is to so carry out the dissolving process that the lime is not deposited in the form of nitrate of calcium, but in the form of a double salt composed of nitrate of calcium and ammonium, for instance nitrate of ammonium. Another valuable feature of the process lies in the fact that, according to our invention we are enabled by simple means to separate the lime and the iron contained in the raw material from the phosphoric acid.

By means of our improved process we are able to produce in a simple manner nitrate products of a varying nature, suitable for fertilizer purposes.

Other features of our invention will be explained in the following description of preferable specific methods of carrying out our invention, and in the claims.

Our invention may be carried out in the following manner.

Raw phosphate is dissolved by means of nitric acid and to the so obtained solution is added, for instance, ammonium nitrate. Thereby a double salt of calcium nitrate and ammonium nitrate is formed.

The crystallization of this double salt may be accelerated by adding small quantities of crystals of the double salt which is to be obtained. It is possible by varying the concentration of the solution treated and the quantity of ammonium nitrate added, to have the lime deposited in the form of different desirable double salts. This may be of importance, when the salt obtained is used for the purpose of producing compound fertilizers, it being possible in this simple manner to obtain any desired proportion of the different kinds of plant aliments.

The solubility of these double salts is to some degree different. As a matter of course the double salts, whose solubility under the conditions in question is less than that of the calcium nitrate, are ordinarily of the greatest importance for the carrying out of this invention. No artificial cooling is required in order to have the lime separate in the form of a double salt. Even at temperatures above 42° (the melting point for $Ca(NO_3)_2.4H_2O$), that is to say under conditions when $Ca(NO_3)_2.4H_2O$ cannot exist in solid state at all, it is possible to obtain a crystallization of a double salt of $Ca(NO_3)_2$ and $NH_4NO_3$ in such quantities that the process may be utilized profitably in industry.

The crystallization of the double salts may, if desired, be effected simultaneously with the concentration of the solution by evaporation, and this procedure greatly simplifies the process. As will be understood however the crystallization may also be continued down to atmospheric temperature.

When it is desired to reduce the solubility of the double salts further, it may in some cases be suitable to add some nitric acid before the crystallization process takes place.

Instead of adding nitrate of ammonia to the solution, the same may be formed in the solution by introducing into the same ammonia or ammonia and nitric acid; in this case the heat thereby created may be used for the purpose of evaporating some water, and we may then also employ vacuum. It will be seen from this that it may be advisable to use nitric acid in excess in the solution process, so much the more as it is advantageous for dissolving some raw phosphates to use an excess of nitric acid.

As mentioned in the preamble, the process may advantageously be carried out in a manner whereby we are enabled by simple means to separate the lime and iron of the raw phosphate from the phosphatic acid.

The invention may then be carried out in the following manner (reference being had also to the diagrammatic drawing annexed):

Finely crushed calcined raw phosphate is dissolved in diluted nitric acid, the latter being in excess of 10%. The resulting solution chiefly will consist of:

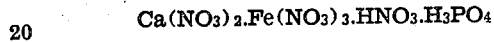
$$Ca(NO_3)_2.Fe(NO_3)_3.HNO_3.H_3PO_4$$

The solution is filtered and nitrate of ammonia is added in a suitable quantity (for instance 10–15% of the quantity of nitrate of calcium) for the production of double nitrate of calcium-ammonium. A diluted solution contained about 30–40% water is thus obtained.

This dilute solution is evaporated in an apparatus with dephlegmator and wash-tower, down to 18–20% water. Cooling the so obtained solution down to 20° centigrade will cause a crystallization of 80–85% of the lime, in the form of a double salt of the formula $$5[Ca(NO_3)_2.2aq]NH_4NO_3$$

Simultaneously about 80% of the iron settles out as triphosphate ferriacid ammonia,

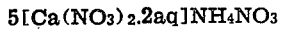
$$Fe(PO_4)_3H_6.NH_3.$$

These products are filtered and washed with nitric acid, whereupon the crystalline mass is treated with warm nitrate of lime solution, so that the double nitrate of calcium ammonium is dissolved and may be further treated in well known manner, for instance in a nitrate of lime plant. The iron-complex salt remaining undissolved is thereupon washed and may be treated further for obtaining oxide of iron and phosphates soluble in water.

The solution remaining after the just described crystallization processes and still containing some lime and iron is neutralized with ammonia at about 100° C., whereby the whole quantity of the remaining iron and lime is deposited in the form of phosphate of calcium and phosphate of iron. It is advisable to dilute the treated solution in order to prevent phosphate of ammonium from crystallizing during the deposition of dicalcium phosphate. The diluting may be effected by means of a solution which is at 20°–30° centigrade saturated in respect of nitrate of ammonia and diammonium phosphate, as will be explained below.

The above named phosphates (calcium and iron) are filtered and thereafter are dissolved in the wash-acid resulting from the washing out of the double nitrate of calcium-ammonium and of the iron complex salt, and thereupon the so obtained solution is added to the acid solution from the dissolving process before the latter is evaporated. As an alternative, the process may also be carried out in such manner that the phosphates are directly dissolved in the acid dissolving solution.

In this manner the remaining quantities of lime and iron are returned to the initial solution for the deposition of the double salt of calcium ammonium and the iron complex compound (see diagram).

In carrying out the process as a cyclic process it is possible to obtain a quantitative separation of the content of iron and lime from the phosphoric acid content of the raw phosphates.

A further step in the complete process is the following. The filtrate obtained by the just described phosphate deposition, containing mono- and diammonium-phosphate, nitrate of ammonia and water having been neutralized with ammonia, all of the mono-ammonium-phosphate is transformed into diammonium-phosphate, after which it is cooled down to 20°–30° centigrade. A mixture of diammonium-phosphate and nitrate of ammonia is thereby crystallized. The remaining solution containing 60–70% nitrate of ammonia and about 1.5% diammonium-phosphate, is concentrated and the solution is added to the acid filtrate obtained (as above described) after the deposition of the double salt and iron complex compounds at the first neutralization with ammonia.

What we claim is:

1. In the treatment of phosphates containing calcium for obtaining therefrom products for use in industry and agriculture, the process which consists in dissolving the phosphate in nitric acid, and adding to the so obtained solution ammonia and nitric acid, the latter in excess, thereby causing the lime to deposit from the acid solution in the form of a double salt of nitrate of calcium and nitrate of ammonium, and separating the deposit from the mother liquor.

2. In the treatment of phosphate materials containing iron and calcium for obtaining therefrom products for use in industry and agriculture, the process which consists in dissolving the phosphate material in nitric acid, and adding to the so obtained solution ammonium nitrate in a proportion adapted to cause the lime to deposit from the acid solution in the form of the double salt $5(Ca(NO_3)_2.2aq)NH_4NO_3$ and the iron as

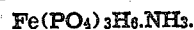
$$Fe(PO_4)_3H_6.NH_3.$$

3. In the treatment of phosphate materials containing iron and calcium for obtaining therefrom products for use in industry and agriculture, the process which consists in dissolving the phosphate material in nitric acid and adding to the so-obtained solution ammonium nitrate in a proportion adapted to cause the lime to deposit from the acid solution in the form of the double salt $5(Ca(NO_3)_2.2aq)NH_4NO_3$ and the iron as

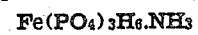
$$Fe(PO_4)_3H_6.NH_3$$

separating the deposit from the solution whereupon the solution remaining after the separation is neutralized with ammonia and the remainder of lime and iron is separated in the form of dicalcium phosphate and ferric phosphate.

4. In the treatment of phosphate materials containing iron and calcium for obtaining therefrom products for use in industry and agriculture, the process which consists in dissolving the phosphate material in nitric acid, adding to the so-obtained solution ammonium nitrate in a proportion adapted to cause the lime to deposit from the acid solution in the form of the double salt $5(Ca(NO_3)_2.2aq)NH_4NO_3$ and the iron as

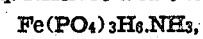
$$Fe(PO_4)_3H_6.NH_3,$$

separating this deposit from the solution whereupon the solution remaining after the separation is neutralized with ammonia and the remainder of lime and iron is separated in the form of dicalcium phosphate and ferric phosphate, and dissolving these last-named phosphates in the acid solution from which the double nitrate of calcium-ammonium and the iron-complex-salt are to be obtained by crystallization in subsequent operation of the process.

5. In the treatment of phosphate materials containing iron and calcium for obtaining therefrom products for use in industry and agriculture, the process which consists in dissolving the phosphate materials in nitric acid, adding to the so obtained solution ammonium nitrate in a proportion adapted to cause the lime to deposit from the acid solution in the form of the double salt 5(Ca(NO₃)₂.2aq)NH₄NO₃ and the iron as

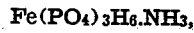
Fe(PO₄)₃H₆.NH₃, separating this deposit from the remaining solution, neutralizing the remaining solution with ammonia, so as to deposit the remainder of lime and iron in the form of phosphates, separating these deposited phosphates and thereupon dissolving these last-named phosphates in the acid solution with which a repetition of the process is to be started, whereby a cyclic process is created, securing a quantitative separation of the lime and iron of the original phosphate material from the phosphoric acid.

6. In the treatment of phosphate materials containing iron and calcium for obtaining therefrom products for use in industry and agriculture, the process which consists in dissolving the phosphate material in nitric acid and adding to the so obtained solution ammonium nitrate in a proportion adapted to cause the lime to deposit from the acid solution in the form of the double salt 5(Ca(NO₃)₂.2aq)NH₄NO₃ and the iron as

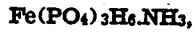
Fe(PO₄)₃H₆.NH₃, separating this deposit from the solution whereupon the solution remaining after the separation is neutralized with ammonia, thereby depositing the remainder of lime and iron in the form of dicalcium phosphate and ferric phosphate, separating these deposited phosphates from the solution and treating the solution obtained after the separation of phosphates with more ammonia and thereupon cooling it to obtain diammonium-phosphate and ammonium nitrate by crystallization.

7. In the treatment of phosphate materials containing iron and calcium for obtaining therefrom products for use in industry and agriculture, the process which consists in dissolving the phosphate material in nitric acid and adding to the obtained solution ammonium nitrate in a proportion so adapted to cause the lime to deposit from the acid solution in the form of the double salt 5(Ca(NO₃)₂.2aq)NH₄NO₃ and the iron as

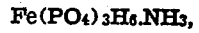
Fe(PO₄)₃H₆.NH₃, separating this deposit from the solution whereupon the solution remaining after the separation is neutralized with ammonia thereby depositing the remainder of lime and iron in the form of dicalcium phosphate and ferric phosphate separating these deposited phosphates from the solution and treating the solution obtained after the separation of phosphates with more ammonia and thereupon cooling it to obtain a deposit of diammonium-phosphate and ammonium nitrate by crystallization, separating this deposit, and adding the mother liquor from this separation to the acid filtrate obtained from the separation of the double salt and iron complex salt in a subsequent operation of the process and before neutralizing the solution with ammonia.

ANTONIUS FOSS.
OLAF JENSEN.
ODD HERBERT LUNDE.